United States Patent [19]

Tillotson

[11] 4,405,393

[45] * Sep. 20, 1983

[54] METHOD FOR FORMING A LAYER OF BLOWN CELLULAR URETHANE ON A CARPET BACKING

[76] Inventor: John G. Tillotson, Tiarco Dr., Dalton, Ga. 30720

[*] Notice: The portion of the term of this patent subsequent to Jan. 2, 1996, has been disclaimed.

[21] Appl. No.: 478

[22] Filed: Jan. 2, 1979

Related U.S. Application Data

[63] Continuation of Ser. No. 872,341, Jan. 25, 1978, Pat. No. 4,132,817, which is a continuation-in-part of Ser. No. 782,636, Mar. 30, 1977, Pat. No. 4,171,395.

[51] Int. Cl.³ .................... B32B 31/00; B32B 5/20
[52] U.S. Cl. ........................................ 156/78; 156/79; 156/80; 156/238; 156/344; 264/46.2; 264/243; 264/257; 427/244; 428/95; 428/97; 428/319.3; 428/304.4
[58] Field of Search .............. 427/244, 314, 316, 322, 427/324, 333, 373, 407, 424, 425; 428/85, 93, 95, 96, 97, 245, 260, 310, 315, 425; 156/78, 79, 80, 238, 344; 264/45.8, 46.2, 243, 257

[56] References Cited

U.S. PATENT DOCUMENTS

| | | | |
|---|---|---|---|
| 3,269,882 | 8/1966 | Willy | 156/80 X |
| 3,328,225 | 6/1967 | Urbanic et al. | 156/78 X |
| 3,519,526 | 7/1970 | Carey et al. | 428/95 |
| 4,035,529 | 7/1977 | Meisert et al. | 427/244 |
| 4,078,100 | 3/1978 | Doerfling | 427/314 |
| 4,132,817 | 1/1979 | Tillotson | 427/244 |

*Primary Examiner*—Robert A. Dawson
*Attorney, Agent, or Firm*—Jones & Askew

[57] ABSTRACT

A method of forming a layer of blown cellular urethane on a primary carpet backing comprising the steps of preparing a mixture of reactive urethane forming agents, controlling the temperature of the reactive mixture, shaping the reactive mixture into a layer upon a latex film, heating the urethane forming mixture to initiate chemical blowing of the mixture, applying the underside of a previously tufted and heated primary carpet backing directly to the upper surface of the mixture, heating the mixture to a predetermined temperature, applying pressure to the carpet and mixture and stripping the carpet and cellular urethane layer from the conveyor belt.

11 Claims, 1 Drawing Figure

U.S. Patent
Sep. 20, 1983
4,405,393
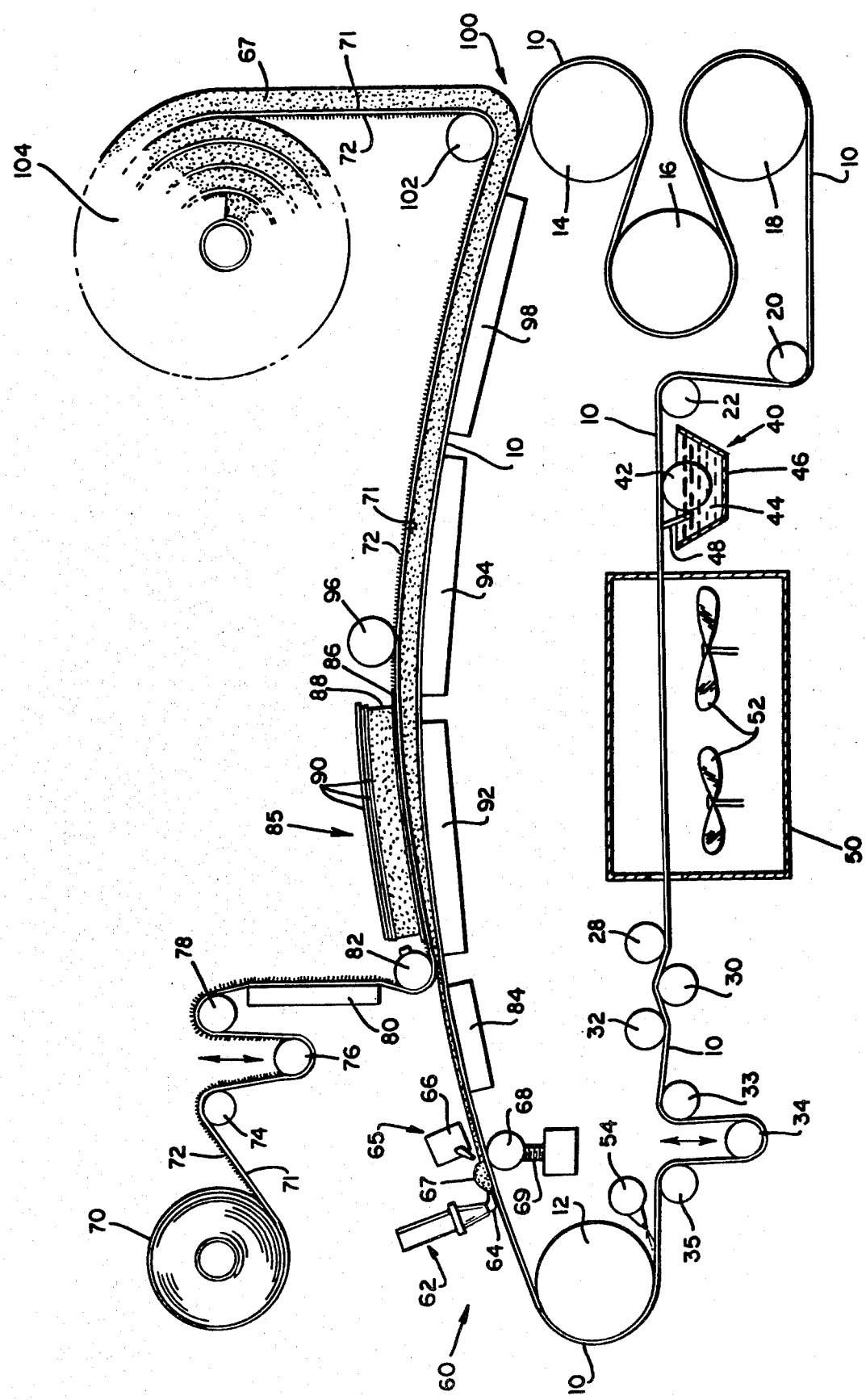

METHOD FOR FORMING A LAYER OF BLOWN CELLULAR URETHANE ON A CARPET BACKING

CROSS-REFERENCE TO RELATED APPLICATION

This application is a continuation of copending application Ser. No. 872,341, filed Jan. 25, 1978, now U.S. Pat. No. 4,132,817, which in turn is a continuation-in-part of U.S. patent application Ser. No. 782,636 filed Mar. 30, 1977, now U.S. Pat. No. 4,171,395.

BACKGROUND OF THE INVENTION

This invention relates to a method and apparatus for forming a layer of blown cellular urethane on a carpet backing. Various methods and apparatuses have been devised for forming urethane foam cushions or pads on fabric carpet backings. However, none of these previous methods or apparatuses have proven satisfactory and none have achieved any significant commercial success. In many of the previous methods, the unreacted urethane reactants are applied directly to the underside of the carpet primary backing. The primary backing has tuft loops or weave strands exposed on and protruding from its underside. The texture and porosity of these backings has limited the effectiveness of the application method which in turn has resulted in the formation of carpet cushions of uneven thickness once the urethane has expanded and cured.

Accordingly, it is an object of the present invention to provide an improved method for forming a layer of blown cellular urethane on a carpet fabric backing.

Another object of the invention is to provide improved apparatus for forming a layer of blown cellular urethane on a carpet fabric backing.

These and other objects, features and advantages of the present invention will be apparent from reviewing the following more detailed description of the invention.

SUMMARY OF THE INVENTION

In one form of the invention, a method of forming a layer of blown cellular urethane on a carpet fabric backing is provided which comprises the steps of preparing a mixture of reactive urethane forming agents, controlling the temperature of the mixture, shaping the mixture into a layer, heating the mixture to initiate chemical blowing thereof, and applying the underside of a heated carpet backing fabric to the mixture. The mixture is then heated to a predetermined temperature to regulate chemical blowing and curing and to form an enlarged layer of cellular urethane on the carpet backing fabric. During the blowing phase of the mixture, pressure is applied to the upper surface of the carpet.

In another form of the invention, a method of forming a blown cellular urethane cushion on a carpet fabric backing is provided that comprises the steps of preparing a mixture of reactive foam urethane forming agents, coating an elastomeric film onto a conveyor belt, depositing the mixture onto the film and controlling the temperature of the mixture. The mixture is then shaped into a layer on the film, heated to initiate chemical blowing, and applied with the film to the underside of a previously tufted and preheated carpet backing fabric. The mixture is then heated to a predetermined temperature to regulate the chemical blowing and curing thereof to form a cullular urethane cushion. During the blowing phase of the mixture, pressure is applied to the upper surface of the carpet.

In an additional form of the invention, equipment is provided for forming a layer of blown cellular urethane on the underside of a carpet backing fabric. The apparatus comprises an endless conveyor belt, drive rollers for driving the belt along a substantially convex conveyor path, apparatus for coating an elastomeric film onto the conveyor belt, apparatus for tensioning the conveyor belt, apparatus for depositing a urethane forming mixture onto the film on the conveyor belt, apparatus for controlling the temperature of the mixture, and apparatus for flattening the conveyor belt at said point of deposition. The equipment also includes apparatus for shaping the deposited mixture into a layer on the conveyor belt, apparatus for preheating the reactive mixture and apparatus for conveying the underside of a pre-heated and tufted carpet backing fabric into flush contact with the mixture. Apparatus is also provided for applying pressure to the carpet during and after the chemical blowing of the mixture. Further, apparatus is provided for heating the mixture to a predetermined temperature while it is in flush contact with the underside of the carpet backing fabric thereby controlling the chemical blowing and curing of the mixture to simultaneously form a chemically blown cellular urethane material on the carpet backing fabric.

It has been found that one of the critical factors in successfully carrying out the method of the present invention is the necessity of carefully controlling the temperature of the urethane forming mixture in all phases of its use. Before the mixture is deposited on the carrier belt, or the elastomeric film on the carrier belt, the temperature of the belt is brought to approximately 75° F. by blowing chilled dry air on its undersurface. Further means are provided for bringing the temperature of the reactive mixture to approximately 75° F. by cooling the tanks containing the components of the reactive mixture and the transversing mixing head.

Instead of using the customary doctor blade to spread and gauge the layer of reactive mixture, it has been found that a uniform layer of reactants is best accomplished by spreading and gauging the reactive mixture with a knife of compressed air. Additionally, the temperature of the knife of compressed air is maintained at approximately 65° F.

To further aid in the production of a uniform layer of the reactive mixture, means are provided for tensioning the carrier belt and then drawing the tensioned belt over a ledger bar at the point of spreading of the reactive mixture. The ledger bar functions to flatten the belt and thereby assure a uniform distance between it and the knife of compressed air.

After the reactive mixture has been uniformly spread and gauged, the temperature of the reactants is closely controlled by means of a series heated platens underlying the carrier belt. Different temperature parameters are employed so as to control the chemical blowing and curing of the reactive mixture throughout the process.

Pressure may be applied to the upper surface of the carpet during two phases of the reactive mixture foam-producing process. A pressure blanket rides on top of the upper surface of the carpet immediately after the carpet is applied to the reactive mixture. The pressure blanket helps control the amount of reactant penetration into the fabric, helps to level the reactants, prevents heat loss from the carpet fabric to the air and assures intimate contact between the carrier belt and the heated platens under it for effective heat transfer.

Following blowing of the reactive mixture by internal gas generation, pressure may be applied to the upper surface of the carpet by a gauge roller. The pressure exerted by the gauge roller functions to eliminate gas pockets that may have formed due to gas that has migrated from the inter spaces of the carpet to the carpet-foam interface. If these gas pockets are permitted to remain, partial or total delamination of the foam from the carpet backing fabric could result.

BRIEF DESCRIPTION OF THE DRAWING

The drawing is a schematic diagram of apparatus for forming a layer of blown cellular urethane on a carpet backing fabric embodying principles of the invention.

DESCRIPTION OF THE PREFERRED EMBODIMENTS

Referring now in more detail to the drawing, there is shown apparatus comprising an endless conveyor belt 10 extending along an endless conveyor path over four drive rollers 12, 14, 16 and 18 which are driven by an electric motor (not shown), idler rollers 20 and 22, belt guide rollers 28, 30 and 32 and belt tensioner rollers 33, 34 and 35. From drive roller 14, the conveyor belt, which preferably is constructed from Teflon coated fiber glass, is seen to pass around drive rollers 16 and 18. The belt is then delivered by idler rollers 20 and 22 to film coating station 40 consisting of an applicator roller 42 partially submerged in a liquid elastomeric composition mixture 44 in a trough 46. The mixture consists of ethylene vinyl acetate latex, surfactant, thickener, flame retardant and an internal lubricant. A doctor blade 48 is positioned downstream of the applicator roller to control the thickness of the film as it is coated onto the belt by wiping off any excess which then flows down the blade back into the trough. The film on the coated belt is then dried in a circulating hot air dryer 50 in which a series of fans 52 are rotatably housed. The dried elastomeric film has a thickness of from 0.0005 inches to 0.002 inches, preferably 0.001 inch and a weight per square yard of from 0.4 ounces to 2 ounces, preferably 0.9 ounces. The belt with the dried elastomeric film thereon is then passed over belt guide rollers 28, 30 and 32 so as to properly position the belt in preparation for urethane deposition. The elastomeric film may, in the alternative, consist of a layer of an olefin material such as polyethylene or polypropylene, or a layer of polyvinyl chloride or rubber lattices such as natural or synthetic SBR latex rubber. In addition, the elastomeric film may be extruded onto the belt.

With continued reference to the drawing, conveyor belt 10 with the dried elastomeric film thereon is seen to pass over idler roller 33, belt tension adjusting roller 34, which is movable in a vertical direction, idler roller 35 and drive roller 12. After the film is dried and before the urethane reactants are deposited on the belt at deposition station 60, the temperature of the belt is brought to between 50° and 100° F., preferably 75° F., by blowing chilled, dry air on the belt from belt cooler 54. Belt cooler 54 is a perforated pipe which extends transversely across the entire width of conveyor belt 10 and is arranged so as to direct chilled, dry forced air to both the underside of conveyor belt 10 and drive roll 12.

The urethane deposition station 60 includes traversing mixer 62 having the mouth of a downwardly extending spout 64 disposed above conveyor belt 10. Urethane reactants consisting of polyol, isocyanate, water and suitable catalyst are dispensed into this mixer. The mixture has a transverse time of about one and one-half seconds per pass across the conveyor belt. The urethane reactants and the traversing mixer are cooled so that the temperature of the mixed reactants, as they emerge from the mixer, may be maintained at from 60° to 100° F., preferably 75° F.

In order to assure a uniform lay down of reactants onto the film coated belt, the end of the mixer nozzle is positioned from 0.25 inch to 4 inches, preferably 1⅜ inches above the belt. Additionally, the centerline of the mixer nozzle is positioned from 1 inch to 6 inches, preferably 2½ inches, upstream from a spreading device.

The deposited urethane mixture is then smoothed and spread into a reactive layer by an air knife 65 located at the deposition station but downstream from the mixer spout. The air knife consists of a compressed air jet stream which is directed toward the puddle of deposited reactant 67 by means of a rectangular slot in conduit 66. The slot has an opening of from 0.005 inches to 0.100 inch, preferably 0.013 inches wide. Air at a pressure of from 2 ounces to 60 ounces, preferably 6 ounces to 24 ounces per square inch, is emitted from the slot. The outlet of the slot is positioned 0.05 inches to 2.0 inches, preferably 0.375 inches from the belt and has an angular position relative to the belt so that the air jet impinges the belt with an inclined angle between the air stream and the belt of from 10° to 60°, preferably from 20° to 25°. To further control the rate of reaction of the urethane reactants, the air jet temperature is controlled between 50° and 100° F., preferably 65° F.

In order to aid in uniform spreading of the reactants onto the film coated belt, the belt is flattened by applying a linear force to the belt of from 1 pound to 10 pounds, preferably 5 pounds per inch of belt width and then drawing the tensioned belt over a ledger bar 68 positioned immediately below the air knife 65. This tensioning operation is accomplished by means of belt tension adjusting roller 34 which consists of a weighted floating roll for adjusting the tension on the belt between the roll and the ledger bar. To assure uniform separation of the conveyor belt 10 and the air knife 65, ledger bar 68 is adjustably mounted on jack screws 69 which raise or lower the ends of ledger bar 68.

Simultaneous with the deposition of urethane reactants onto the conveyor belt, a carpet 70 of conventional tufted or woven construction, with exposed tufted looped backs or exposed weave strands in a backing fabric 71, is dispensed from a carpet supply roll. The carpet backing from which face yarn 72 freely extends is passed over idler roller 74, tension adjusting roller 76, which is movable in a vertical direction, and idler roller 78. The carpet is then fed over a heater 80 which heats the backing to a temperature of between 100° and 300° F., preferably between 140° and 180° F. The fabric backing is then fed under marriage bar 82 to tension the backing as it passes over the heater and marry the backing to the layer of urethane reactants.

In order to control the amount of reactant mixture that penetrates into the applied fabric and to control the amount of gas that is generated by the portion of the mixture which is deposited in the spaces between the loop backs of the fabric, it is very important to partially react the mixture to a closely controlled degree before the heated backing fabric is applied. This is done by passing the belt over reactant preheater 84 which is positioned between ledger bar 68 and marriage bar 82.

Sufficient heat is applied so that the temperature of the layer of reactants is maintained at 90° to 150° F., preferably from 110° to 130° F., at the precise time the heated backing fabric is applied to the reactant mixture.

After the carpet has been heated and linearly tensioned, its backing fabric is brought into flush contact with the layer of urethane forming reactants by passing the carpet under marriage bar 82. The speed of the ladened conveyor belt and of the carpet backing are set so that they pass through the urethane forming station 85 at the same velocity.

Immediately after the heated backing fabric is applied to the partially reacted urethane, it is necessary to press the backing fabric against the reactants with a force of 0.2 ounces to 5 ounces, preferably 1 ounce to 2 ounces per square inch, for part or all of the time that gas is being evolved by the reactive mixture, i.e., from 1 to 100 seconds, preferably 30 to 50 seconds. This is accomplished by drawing the ladened belt under a blanket of predetermined weight. The blanket consists of a low friction fabric 86, preferably Teflon coated fiber glass, which rides over the face yarn 72 of the carpet, a layer of load distributing foam 88, preferably urethane foam, disposed on the low friction fabric and a load of thin metal sheets 90 disposed on top of the load distributing foam. The low friction fabric is fastened at one end so that the blanket pressure is applied to the carpet immediately after the carpet fabric backing is applied to the urethane reactants.

During the time that the reactants are evolving gas, it is most important to control their temperature in order to prevent collapse of the foam. This is done by adjusting the temperature of the reactant heater 92 and the pre-cure heater 94 so that the reactants are raised to a temperature of from 120° to 200° F., preferably from 140° to 150° F., and held at that temperature for a period of from 15 seconds to 120 seconds, preferably 50 seconds to 75 seconds.

After gas evolution is complete and before curing, the ladened belt may be passed under a gauge roll 96 which is positioned at a predetermined fixed distance past the pre-cure heater 94 and at a predetermined distance downstream from the pressure blanket. This gauge roller has two functions. It levels the foam to a uniform desired thickness and readheres the carpet to the still tacky foam in any areas where gas pockets have formed. These gas pockets are inherent to the process and result from gas which evolves in the interfiber spaces of the fabric. Since the interfiber spaces are not large enough to accommodate a cellular structure, any gas evolved there migrates outside the fiber bundles and produces gas pockets. This condition has the potential of causing delamination of the foam layer from the carpet fabric backing. However, when sufficient pressure is applied to the carpet by the gauge roll 96, approximately 0.5 pounds to 10 pounds per square inch, a bond between the carpet and the tacky foam is reestablished. In this way, a satisfactory bond between the foam and the carpet may be assured, in spite of the extent of delamination which may occur during the gas evolution reaction. Since delamination is not always a problem, the use of a gauge roll is optional.

After completion of gas evolution and passage under the gauge roll (if employed), the coated carpet is heated for an additional time to effect the desired cure of the urethane foam. This is accomplished by passing the ladened belt over cure heater 98 to raise the temperature of the foam to 150° to 350° F., preferably 250° to 300° F. Optionally, this final heat curing step may be done after the composite is stripped from the carrier belt or partially before and partially afterward.

Finally, the carpet, together with the blown cellular urethane layer and elastomeric film, is stripped from the belt at the exit 100 of station 85, fed over stripper roll 102 and onto take-up reel 104.

It should be noted that the urethane reactive mixture is deposited onto belt 10 while the belt is moving in a substantially convex path from drive roller 12, and maintained in that convex configuration during chemical blowing and curing of the foam as the belt 10 passes over the series of heated platens 84, 92, 94 and 98 until stripped from belt 10 at exit 100 of station 85. It has been found that by depositing urethane reactants onto belt 10 and maintaining the belt in that convex configuration until final curing, it is possible to eliminate longitudinal wrinkles in the carpet fabric and final product. Therefore, the series of heated platens 84, 92, 94 and 98 are arranged so as to form a relatively smooth continuous convex path for belt 10 as it passes from drive roll 12 to drive roll 14.

The final product includes face yarn tufted or woven into a primary carpet backing, a layer of cellular urethane on the undersurface of the backing and loop backs of yarn, and a thin elastomeric film on the urethane.

The precise nature of the formulation which forms an elastomeric film on belt 10 at film coating station 40 or the urethane formulation which forms an integrally bonded urethane cushion for the carpet product is not critical to the present invention. A mixture of ethyl vinyl acetate latex and standard compounding additives have been mentioned and it should be obvious that other film forming materials and lattices will function equally as well.

The urethane material is a polymerization product of a mixture of a polyol, an isocyanate, water and a catalyst system that promotes a polymerization reaction between the isocyanate and the polyol to form the polyurethane. A polyol, which is suitable for use in the present formulation, is the reaction product of a polyol that has been modified by polymerization with either styrene or acrylonitrile or both in the polyol. The degree of modification of the polyol should be from 10% to 100%, preferably 40% to 60%. While the presence or absence of this particular polyol in no way affects the performance of the process, it makes a pronounced improvement in the physical properties of the product. Load bearing capabilities and rate of recovery from deformation are greatly enhanced.

Blowing of the polyurethane composition is effected by controlling the catalyst system, the water concentration and the isocyanate level. Generally, water is present in the reaction mass from between about 0.01 to 5.0 parts per hundred parts polyol, preferably 2 parts to 4 parts, over and above the water normally present in the reaction mixture. The catalyst system not only must effect rapid curing but also must control formation of carbon dioxide resulting from the reaction of water and isocyanate. Blowing should be controlled to effect expansion between about 500% and 6400%, preferably between about 1600% and 3000%, so that a carpet yarn loop back stitch is saturated with reactants and the reactants expand sufficiently prior to curing. Suitable catalysts are those which promote polyurethane formation and concurrently promote the blowing reaction. Preferred catalysts are organic metal compounds, amines, and metal soaps; such catalysts include dibutyl tin dilaurate and stannous octoate.

Suitable additional polyols which may be employed in the present invention are the polyether polyols, having a functionality of at least two, an average molecular weight between about 1000 and 9000 and a hydroxyl number less than 100. Such polyols include polybutylene glycol, polyethylene glycol, polypropylene glycol, 1,2-poly-dimethylene glycol, polydecamethylene glycol and mixtures thereof. Preferred polyols have an average molecular weight of between 2000 and 6000, and particular preferred polyols have a molecular weight of between 3000 and 5000.

A variety of isocyanates may be reacted with the polyols to obtain satisfactory polyurethane blown cellular coatings. Particularly suitable isocyanates are aromatic diisocyanates as they are more reactive and less toxic than the aliphatic diiocyanates. Such diisocyanates include 2,4-toluene diisocyanate, 2,6-toluene diisocyanate, methane diisocyanate, napthylene 1,4-diisocyanate, diphenylmethyl-4,4'-diisocyanate, 3,3'-dimethoxy biphenylene diisocyanate, 4,4'-diphenylene diisocyanate and mixtures thereof. The isocyanate usually is employed in stoichiometric excess to assure complete reaction with the functional groups of the polyol and with the water which is present. Preferably from 20 to 80 parts isocyanate per one hundred parts of polyol are used in the reaction mixture.

The novel and unique features of the present invention include process steps whereby a tufted or woven primary carpet backing fabric is preheated to a temperature of approximately 160° F. and then brought into contact with a urethane forming mixture while the mixture is traveling in a substantially convex path. The urethane forming reactants are then blown and cured into a cellular urethane layer on the carpet primary backing by carefully controlling the temperature of the reactants through application of heat from a series of heated platens disposed in a substantially convex path. Control of the amount of reactant penetration into the fabric, leveling of the reactants, prevention of heat loss from the fabric to the air and intimate contact between the belt and the heated platen is facilitated by application of a pressure blanket to the surface of the carpet immediately after the carpet backing is brought into contact with the urethane forming mixture. Delamination of the foam layer from the carpet fabric backing is prevented by employing a pressure application step before curing of the foam is completed. The urethane reaction mixture is deposited onto a tensioned continuous belt which has been pre-coated with a thin elastomeric film and dried so that the urethane, latex and carpet backing will release easily from the belt at the completion of the process. A uniform coating of the urethane reactants onto the film coated belt is facilitated by delaying gas generation of the urethane reactants until after spreading. This is accomplished by controlling the temperature of the latex coated carrier belt, the urethane reactants and the spreading device. Further assurance of a uniform coating of the urethane reactants is accomplished by passing the urethane coated belt over a ledger bar located immediately beneath the spreading device.

With this method carpet cushion has been successfully formed, in situ, on a backing fabric with the cellular urethane having a density of between one and ten pounds per cubic foot, a thickness of between 1/16 of one inch and one inch, and a homogeneous cell structure substantially free of cells having a diameter larger than ⅛ inch.

It should be understood that the previously described embodiments merely illustrate principles of the invention in selected, preferred form. Many modifications, additions and deletions may, of course, be made thereto without departing from the spirit and scope of the invention as set forth in the following claims.

What is claimed is:

1. Method of forming a layer of blown cellular urethane on a carpet backing fabric comprising the steps of:
    (a) preparing a mixture of reactive urethane forming agents containing sufficient water to cause chemical blowing of the mixture when heated sufficiently and controlling the temperature of the mixture to a temperature of between about 60° and 100° F.;
    (b) providing an endless conveyor belt;
    (c) depositing the mixture of reactive urethane forming agents onto the conveyor belt while the temperature of the belt is controlled to a temperature of between about 50° and 100° F.;
    (d) preheating the lower surface of an uncoated carpet material to a temperature of between 100° and 300° F.;
    (e) preheating the urethane forming mixture to a temperature of between 90° and 150° F. to cause chemical blowing thereof and then bringing the lower surface of the preheated carpet into flush contact with the preheated urethane forming mixture;
    (f) applying pressure to the carpet material while the reactive mixture is undergoing chemical blowing;
    (g) heating the urethane forming mixture to a temperature of between 120° and 350° F. after the preheated carpet is brought into flush contact with the mixture; and
    (h) stripping the coated carpet material from the conveyor belt.

2. The method of claim 1 wherein a layer of liquid latex material is coated onto the conveyor belt before the mixture of urethane forming agents is deposited onto the belt, and the layer is dried to form a latex film, in situ, on the conveyor belt.

3. The method of claim 1 wherein chilled, dry air is blown onto the conveyor belt before the urethane forming mixture is deposited onto the belt.

4. The method of claim 1 wherein:
    the conveyor belt is tensioned by applying a linear force of approximately 1 to 10 pounds;
    the conveyor belt is flattened as the urethane forming mixture is deposited onto the belt;
    the urethane forming mixture is spread into a uniform layer by means of an air knife;
    the temperature of the air in said air knife is controlled to a temperature of between 50° and 100° F.; and
    the pressure of the air in said air knife is controlled.

5. The method of claim 1 wherein the pressure of air in said air knife is controlled to approximately 2 to 60 ounces.

6. The method of claim 1 wherein a pressure blanket is applied to the upper surface of the carpet at a force of 0.2 to 5 ounces per square inch.

7. The method of claim 1 wherein heated platens are disposed below the conveyor belt to heat the urethane forming mixture to a temperature of about 120° to 200° F. during chemical blowing of the mixture and to about 150° to 300° F. thereafter.

8. The method of claim 1 wherein the conveyor belt follows a path which is substantially convex during curing of the urethane forming agents.

9. The method of claim 1 wherein pressure is applied to the upper surface of the carpet after the mixture has substantially completed its chemical blowing but before the reactive mixture has cured by means of passing the upper surface of the carpet under a gauge roller.

10. The method of claim 1 wherein:
said uncoated carpet material is pre-heated to a temperature of between 140° and 180° F.;
said urethane forming mixture is preheated to a temperature of between 110° and 130° F.;
said urethane forming mixture is heated to a temperature of between 140° and 150° F. after the pre-heated carpet is brought into flush contact with the mixture; and
the urethane forming mixture is heated to a temperature of between 250° and 300° F. thereafter.

11. The method of claim 10 wherein:
the temperature of the urethane forming mixture is controlled to a temperature of approximately 75° F. before being deposited on the endless belt; and
the temperature of the endless belt is controlled to a temperature of approximately 75° F.

* * * * *